(12) United States Patent
Sakaray et al.

(10) Patent No.: US 10,800,668 B2
(45) Date of Patent: Oct. 13, 2020

(54) INTEGRATED THERMAL MANAGEMENT AND WATER PURIFICATION SYSTEM

(71) Applicant: Caterpillar Inc., Deerfield, IL (US)

(72) Inventors: Umakanth Sakaray, Dunlap, IL (US); Dhanasekar Murugan, Peoria, IL (US); Curtis Allen Danielson, Rapid City, SD (US)

(73) Assignee: Caterpillar Inc., Peoria, IL (US)

( * ) Notice: Subject to any disclaimer, the term of this patent is extended or adjusted under 35 U.S.C. 154(b) by 95 days.

(21) Appl. No.: 16/125,957

(22) Filed: Sep. 10, 2018

(65) Prior Publication Data
US 2020/0079660 A1    Mar. 12, 2020

(51) Int. Cl.
*C02F 1/16* (2006.01)
*C02F 1/00* (2006.01)
*B01D 1/00* (2006.01)

(52) U.S. Cl.
CPC .............. *C02F 1/16* (2013.01); *B01D 1/0058* (2013.01); *B01D 1/0082* (2013.01); *C02F 1/008* (2013.01); *C02F 2209/02* (2013.01); *C02F 2209/40* (2013.01)

(58) Field of Classification Search
None
See application file for complete search history.

(56) References Cited

U.S. PATENT DOCUMENTS

| | | | |
|---|---|---|---|
| 2,637,684 A * | 5/1953 | Buffum | C02F 1/16 203/1 |
| 4,684,321 A | 8/1987 | Barrett et al. | |
| 2008/0168789 A1* | 7/2008 | Jones | B01D 5/0039 62/291 |
| 2013/0333381 A1 | 12/2013 | Bourhis | |

FOREIGN PATENT DOCUMENTS

| | | |
|---|---|---|
| CN | 201530470 | 7/2010 |
| CN | 103397955 | 10/2015 |
| CN | 106348369 | 1/2017 |
| JP | 6085220 | 10/1994 |
| JP | 2013160132 | 8/2013 |

* cited by examiner

*Primary Examiner* — Derek N Mueller

(57) ABSTRACT

A system for obtaining purified water includes a heat exchanger fluidly coupled to the heat source for receiving a thermal management fluid from the heat source, and a reservoir fluidly coupled with the heat exchanger to supply water, at an ambient temperature, for receiving heat from the thermal management fluid at the heat exchanger. A pump provides a pre-defined flow rate of the water from the reservoir to the heat exchanger based on a temperature gradient of the thermal management fluid across the heat exchanger. A purification device has a cold side chamber in fluid communication with the pump and the heat exchanger while a hot side chamber is in fluid communication with the heat exchanger and the reservoir. The cold and hot side chambers of the purification device thermally co-operate with each other to develop condensate therebetween from moisture present in the ambient air for forming water.

18 Claims, 2 Drawing Sheets

INTEGRATED THERMAL MANAGEMENT AND WATER PURIFICATION SYSTEM

TECHNICAL FIELD

The present disclosure relates to a water purification system. More particularly, the present disclosure relates to an integrated thermal management and water purification system using a single pump for obtaining purified water.

BACKGROUND

Lately, conventional heat harnessing systems have been known to have increased complexity in design and structure. The increased complexity in design may arise, at least in part, due to an increased number and type of components that are typically required to effectively harness heat from a heat source, for example, a thermal management fluid of an engine. An example of such a conventional heat harnessing system, in this case—using a redundant circuit design for accomplishing various fluid flows and their concomitant heat transfers, may be found in the disclosure of Chinese patent 103397955.

In addition to the above, several challenges may be encountered by the conventional heat harnessing systems as these challenges are posed by the inherent nature of the numerous components used in the conventional heat harnessing systems when co-operatively working to tap thermal energy from the heat source. Further, costs that are typically associated with setting up and operating such conventional heat harnessing systems may be less than economical when compared to a value of the function that such conventional heat harnessing systems are designed to provide. Furthermore, as sources of water are becoming scarce and/or polluted globally, it would be prudent to effectively harness thermal energy from a heat source and use the harnessed thermal energy to purify water at a cost that is relatively inexpensive and hence, affordable.

In the quest for effectively and economically harnessing thermal energy from a heat source to produce pure water while keeping system design simple for setting up and operating, and to provide added value, both—in terms of costs and function when compared to conventional heat harnessing systems, there exists a need for an integrated thermal management and water purification system that would overcome the aforementioned drawbacks.

SUMMARY OF THE DISCLOSURE

In an aspect of this disclosure, a system for obtaining purified water using ambient air and heat from a heat source is provided. The system includes a heat exchanger, a reservoir, a pump, and a purification device. The heat exchanger is fluidly coupled to the heat source to receive a thermal management fluid from the heat source. The reservoir is disposed in fluid communication with the heat exchanger. The reservoir is configured to supply water at an ambient temperature for receiving heat from the thermal management fluid at the heat exchanger. The pump is disposed between the reservoir and the heat exchanger. The pump is operable to provide a pre-defined flow rate of the water from the reservoir to the heat exchanger based on a temperature gradient of the thermal management fluid across the heat exchanger. The purification device has a cold side chamber and a hot side chamber. The cold side chamber is disposed in fluid communication with the pump and the heat exchanger. The cold side chamber is configured to allow passage of water from the reservoir therethrough. The hot side chamber is disposed in fluid communication with the heat exchanger and the reservoir. The hot side chamber is configured to allow passage of water from the heat exchanger therethrough. The cold and hot side chambers of the purification device thermally co-operate with each other to develop condensate therebetween from moisture present in the ambient air for forming water.

In another aspect of the present disclosure, an integrated thermal management and water purification system for obtaining purified water using ambient air and heat from a heat source is provided. The integrated thermal management and water purification system includes an engine, a heat exchanger, a reservoir, a pump, and a purification device. The heat exchanger is fluidly coupled to the heat source to receive a thermal management fluid from the heat source. The reservoir is disposed in fluid communication with the heat exchanger. The reservoir is configured to supply water at an ambient temperature for receiving heat from the thermal management fluid at the heat exchanger. The pump is disposed between the reservoir and the heat exchanger. The pump is operable to provide a pre-defined flow rate of the water from the reservoir to the heat exchanger based on a temperature gradient of the thermal management fluid across the heat exchanger. The purification device has a cold side chamber and a hot side chamber. The cold side chamber is disposed in fluid communication with the pump and the heat exchanger. The cold side chamber is configured to allow passage of water from the reservoir therethrough. The hot side chamber is disposed in fluid communication with the heat exchanger and the reservoir. The hot side chamber is configured to allow passage of water from the heat exchanger therethrough. The cold and hot side chambers of the purification device thermally co-operate with each other to develop condensate therebetween from moisture present in the ambient air for forming water.

In yet another aspect of the present disclosure, a method is provided for obtaining purified water using ambient air and heat from a heat source. The method includes receiving a thermal management fluid from the heat source at a heat exchanger fluidly coupled to the heat source. The method further includes supplying water from a reservoir to the heat exchanger at an ambient temperature for receiving heat from the thermal management fluid at the heat exchanger. The method also includes providing, by means of a pump, a pre-defined flow rate of the water from the reservoir to the heat exchanger based on a temperature gradient of the thermal management fluid across the heat exchanger. The method also includes disposing a purification device having a cold side chamber in fluid communication with the pump and the heat exchanger and a hot side chamber in fluid communication with the heat exchanger and the reservoir. The method further includes forming water, via thermal co-operation of the cold and hot side chambers of the purification device by developing condensate from moisture present in the ambient air between the cold and hot side chambers of the purification device.

Other features and aspects of this disclosure will be apparent from the following description and the accompanying drawings.

DETAILED DESCRIPTION

Reference will now be made in detail to specific embodiments or features, examples of which are illustrated in the accompanying drawings.

Figure 1:
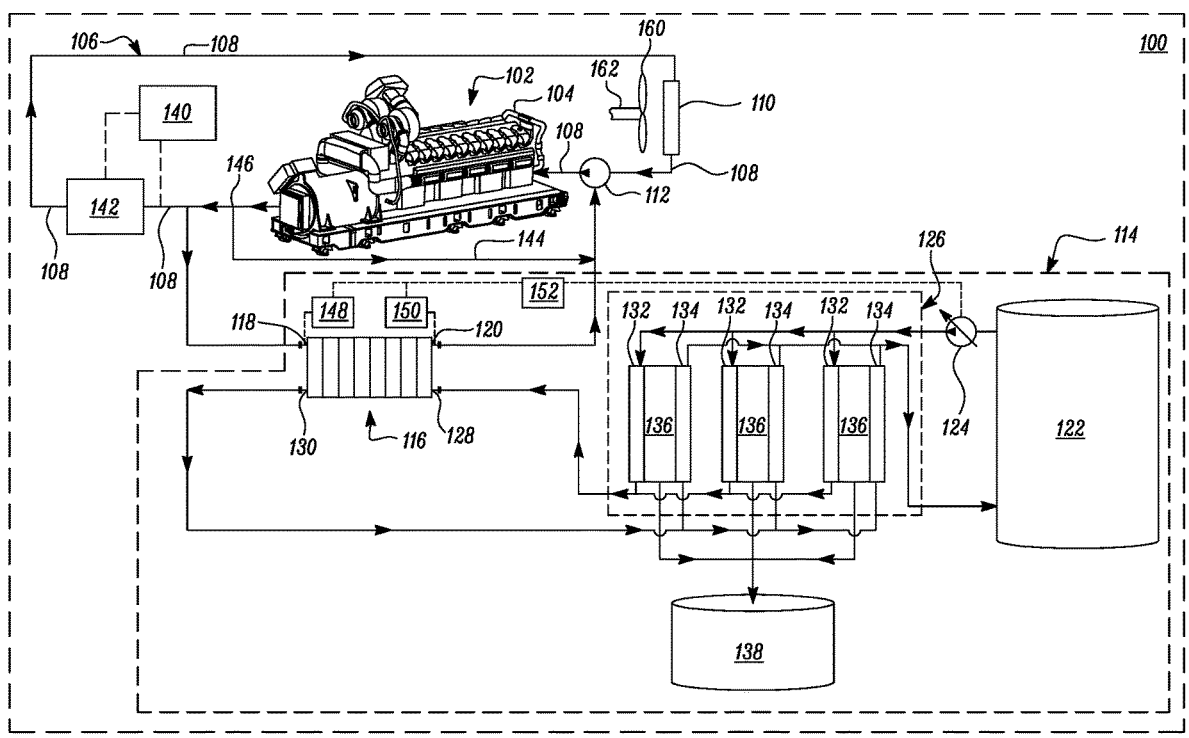
FIG. 1 is a schematic view of an integrated thermal management and water purification system, in accordance with embodiments of the present disclosure.

FIG. 1 illustrates a schematic view of an integrated thermal management and water purification system 100. The integrated thermal management and water purification system 100 may be retrofitted onto an existing heat source 102 such as, but not limited to, an engine for thermal management of the heat source 102 while also obtaining purified water using ambient air and heat from the heat source 102.

As shown in FIG. 1, the integrated thermal management and water purification system 100 includes a heat source 102. In the illustrated embodiment, the heat source 102 is embodied in the form of an engine 104. Although the engine 104 is illustrated herein, it may be noted that the engine 104 is non-limiting of this disclosure. Upon reviewing the present disclosure, it will be evident to persons skilled in the art that other types of heat sources may be used in lieu of, or in addition to, the engine 104 disclosed herein. Persons skilled in the art will, therefore, appreciate that embodiments disclosed in conjunction with the engine 104 can be similarly applied to other types of heat sources.

The engine 104 may be an internal combustion engine, for example, a diesel engine, a gasoline engine, a natural gas engine. It may be noted that a type of engine used is merely exemplary in nature and hence, non-limiting of this disclosure. Other types of engines, for example, a gas turbine engine known to persons skilled in the art may be used in lieu of the internal combustion engine disclosed herein.

The engine 104 has a cooling jacket 106 that contains a thermal management fluid, for example, liquid coolant therein. The cooling jacket 106 may be fluidly coupled in a loop 108 between the engine 104 and a radiator 110. A pump 112 may be disposed within the loop 108 associated with the cooling jacket 106. This pump 112 may be operable for regulating a pressure and flow rate at which the thermal management fluid is supplied to the cooling jacket 106 adjacent the engine 104.

The integrated thermal and water purification system 100 also includes a system 114 for obtaining purified water using ambient air and heat from the heat source 102, explanation to which will be made herein. With continued reference to FIG. 1, the system 114 includes a heat exchanger 116 that is fluidly coupled to the heat source 102 to receive the thermal management fluid from the heat source 102. In an embodiment herein, a first inlet port 118 would be provided to the heat exchanger 116 for receiving the thermal management fluid. Further, a first outlet port 120 would also be provided to the heat exchanger 116. This first outlet port 120 would be disposed in fluid communication with the first inlet port 118 for allowing the thermal management fluid to egress the heat exchanger 116.

The system 114 also includes a reservoir 122, a pump 124, and a purification device 126. The reservoir 122 is disposed in fluid communication with the heat exchanger 116. The reservoir 122 is configured to supply water at an ambient temperature for receiving heat from the thermal management fluid at the heat exchanger 116. In an embodiment herein, a second inlet port 128 would be provided to the heat exchanger 116 for receiving the water from the reservoir 122. Further, a second outlet port 130 would also be provided to the heat exchanger 116. This second outlet port 130 would be disposed in fluid communication with the second inlet port 128 for allowing the received water to egress the heat exchanger 116.

The pump 124 is disposed between the reservoir 122 and the heat exchanger 116. The pump 124 is operable to provide a pre-defined flow rate of the water from the reservoir 122 to the heat exchanger 116 based on a temperature gradient of the thermal management fluid across the heat exchanger 116. In an embodiment, the pre-defined flow rate of the water supplied by the pump 124 to the heat exchanger 116 is directly proportional to the temperature gradient of the thermal management fluid across the heat exchanger 116. For example, if the temperature gradient of the thermal management fluid across the heat exchanger 116 is 18 degree Celsius (° C.), then the flow rate of water supplied by the pump 124 could be about 60 liters per minute (LPM). However, if the temperature gradient of the thermal management fluid across the heat exchanger 116 is 36 degree Celsius (° C.), then the flow rate of water supplied by the pump 124 could be about 120 liters per minute (LPM).

As such, in embodiments herein, the pump 124 used could be a variable displacement pump that can provide different flow rates of water from the reservoir 122 based on the temperature gradient of the thermal management fluid across the heat exchanger 116. Moreover, persons skilled in the art will appreciate that various system hardware and software could be suitably implemented in use for controlling the displacement of the pump 124 and subsequently altering the flow rate of water supplied by the pump 124 from the reservoir 122 to the heat exchanger 116. Explanation to one such arrangement of system hardware for controlling the displacement of the pump 124 will be discussed later herein.

Further, as shown, the purification device 126 has a cold side chamber 132 and a hot side chamber 134. The cold side chamber 132 is disposed in fluid communication with the pump 124 and the heat exchanger 116 i.e., the second inlet port 128 of the heat exchanger 116. The cold side chamber 132 is configured to allow passage of water from the reservoir 122 therethrough. The hot side chamber 134 is disposed in fluid communication with the heat exchanger 116 i.e., the second outlet port 130 of the heat exchanger 116 and the reservoir 122. The hot side chamber 134 is configured to allow passage of water from the heat exchanger 116 therethrough. The cold and hot side chambers 132, 134 of the purification device 126 thermally co-operate with each other for forming water by developing condensate therebetween from moisture present in the ambient air.

In an embodiment herein, a condensate chamber 136 may be disposed in between the cold and hot side chambers 132, 134 of the purification device 126. The condensate chamber 136 could provide a substrate for developing the condensate thereon. Also, in embodiments herein, a purified water tank 138 would be disposed in fluid communication with the purification device 126, for instance, the condensate chamber 136 of the purification device 126. This purified water tank 138 would be configured to receive the water formed in the condensate chamber 136 that is between the hot and cold side chambers 134, 132 of the purification device 126.

In an embodiment as shown in FIG. 1, the integrated thermal management and water purification system 100 could also include a thermostat 140 and a vario-restrictive flow control valve 142 coupled to the thermostat 140. Further, as shown, the integrated thermal management and water purification system 100 may also include a coolant return line 144 fluidly coupling a first point 146 located on the loop 108 of the cooling jacket 106 between the engine 104 and the vario-restrictive flow control valve 142 with the pump 124. Prior to operation, the thermostat 140 could be pre-set with one or more temperature threshold values that provide a pre-defined logic to the thermostat 140 for rendering the vario-restrictive flow control valve 142 in a fully open position, a fully closed position, or a partially open position based on specific requirements that are likely to be associated with the operation for the integrated thermal management and water purification system 100, for example, to meet one or more thermal management requirements associated with the engine 104 and/or to meet one or more requirements of the system 114 for obtaining purified water.

For operating the integrated thermal management and water purification system 100, first an operation of the engine 104 would be commenced. As the engine 104 temperature increases to a value above ambient temperature, a temperature of the thermal management fluid in the cooling jacket 106 would also correspondingly increase. This thermal management fluid may flow through the loop 108 of the cooling jacket 106 i.e., back and forth between the radiator 110 and the engine 104.

If, for example, a first threshold value of 80° C. is pre-set at the thermostat 140, then for temperatures of the thermal management fluid up to and including 80° C., the thermostat 140 may configure the vario-restrictive flow control valve 142 to provide a nominal restriction, for example, 20-25% reduction in the flow rate of the thermal management fluid in the loop 108 of cooling jacket 106. Therefore, most of the thermal management fluid would be routed via the loop 108 of the cooling jacket 106 while little or no thermal management fluid would be forced to flow into the coolant return line 144 and/or into the heat exchanger 116 via the first inlet port 118 of the heat exchanger 116.

In continuation to the previous example, if the temperature of the thermal management fluid in the loop 108 of the cooling jacket 106 increases to a value above the first threshold value of 80° C. but remains less than a second threshold value of 90° C. pre-set at the thermostat 140, the thermostat 140 may configure the vario-restrictive flow control valve 142 to provide a partial restriction that is more than the nominal amount of restriction, for example, 50-75% reduction in the flow rate of the thermal management fluid in the loop 108 of cooling jacket 106. This way, the thermal management fluid, and its associated excess heat, indicated by the increased temperature of the thermal management fluid at the thermostat 140, can be, at least partially, routed to the heat exchanger 116 via the first inlet port 118 of the heat exchanger 116.

In further continuation to the example above, if the temperature of the thermal management fluid in the loop 108 of the cooling jacket 106 increases to a value above the second threshold value of 90° C. pre-set at the thermostat 140, the thermostat 140 may configure the vario-restrictive flow control valve 142 to provide little or no restriction, for example, 0-25% reduction in the flow rate of the thermal management fluid in the loop 108 of cooling jacket 106. This way, the thermal management fluid, and its associated excess heat indicated by the increased temperature of the thermal management fluid, can be fully routed to the radiator 110, the coolant return line 144, and the heat exchanger 116 via the first inlet port 118 of the heat exchanger 116.

In another example, a pair of threshold values could be pre-set at the thermostat 140 to initiate an opening of the vario-restrictive flow control valve 142 at or above a first threshold value, and close at a second threshold value higher than the first threshold value. It will be appreciated by persons skilled in the art that any type of pre-defined logic encompassing one or more threshold values can be pre-set at the thermostat 140 to control an opening and closing of the vario-restrictive flow control valve 142.

In light of the above examples, it is evident that a change in the positioning of the vario-restrictive flow control valve 142 affects an overall temperature gradient that can be obtained at the heat exchanger 116. Based on this temperature gradient, the pump 124 can be operated to vary its displacement and hence, the flow rate of the water from the reservoir 122 to the heat exchanger 116 via the cold side chamber 132 of the purification device 126. As disclosed earlier herein, the pre-defined flow rate of water supplied by the pump 124 would be directly proportional to the temperature gradient of the thermal management fluid across the heat exchanger 116.

Consequently, it is hereby envisioned that the amount of condensate that could develop in the condensate chamber 136 of the purification device 126 would vary based on the pre-defined flow rate of water supplied by the pump 124 to the heat exchanger 116 when sufficient temperature gradient exists in the thermal management fluid at the heat exchanger 116 so that another temperature gradient could exist between the cold and hot side chambers 134 of the purification device 126 for developing the condensate from moisture in the ambient air and forming water from the developed condensate.

As shown in the embodiment of FIG. 1, the system 114 for purifying water may further include a first temperature sensor 148, a second temperature sensor 150, and a controller 152. The first temperature sensor 148 is disposed at the first inlet port 118 of the heat exchanger 116 and is configured to measure a first temperature value associated with the thermal management fluid entering the heat exchanger 116 via the first inlet port 118. The second temperature sensor 150 is disposed at the first outlet port of the heat exchanger 116 and is configured to measure a second temperature value associated with the thermal management fluid egressing the heat exchanger 116 via the first outlet port 120.

The controller 152 is disposed in communication with the first temperature sensor 148, the second temperature sensor 150, and the pump 124. The controller 152 is configured to receive the first and second temperature values from the first and second temperature sensors 148, 150 respectively, determine the temperature gradient of the thermal management fluid across the heat exchanger 116 from the first and second temperature values, and vary a displacement of the pump 124 for facilitating the pump 124 to provide the pre-defined flow rate of the water from the reservoir 122 to the heat exchanger 116 based on the determined temperature gradient of the thermal management fluid across the heat exchanger 116.

The controller 152 disclosed herein could include various software and/or hardware components that are configured to perform functions consistent with the present disclosure. As such, the controller 152 of the present disclosure may be a stand-alone controller that may or may not be configured to co-operate with an existing electronic control module (ECU) (not shown) of the engine 102. Alternatively, the controller 152 may form part of the ECU, associated with the engine 102, that can also be operated for controlling a displacement of the pump 124. Furthermore, it may be noted that the controller 152 may embody a single microprocessor or multiple microprocessors that include components for selectively and independently actuating specific system hardware, for example, actuators such as solenoids and other components that are associated with the pump 124.

Figure 2:
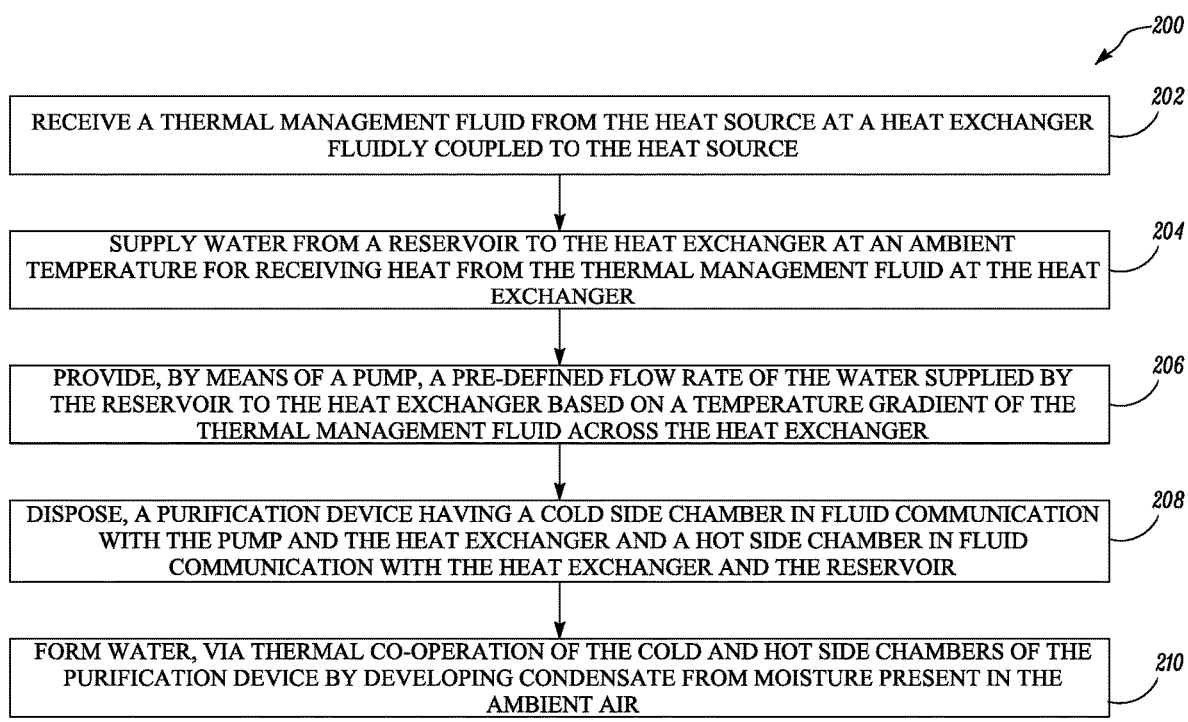
FIG. 2 is a flowchart of a method for obtaining purified water using ambient air and heat from a heat source, in accordance with an embodiment of the present disclosure.

FIG. 2 illustrates a flowchart of a method 200 for obtaining purified water using ambient air and heat from the heat source 102. As shown at step 202, the method 200 includes receiving the thermal management fluid from the heat source 102 at the heat exchanger 116 that is fluidly coupled to the heat source 102. At step 204, the method 200 further includes supplying water from a reservoir 122 to the heat exchanger 116 at an ambient temperature for receiving heat from the thermal management fluid at the heat exchanger 116. At step 206, the method 200 also includes providing, by means of the pump 124, the pre-defined flow rate of water from the reservoir 122 to the heat exchanger 116 based on the temperature gradient of the thermal management fluid across the heat exchanger 116. At step 208, the method 200 also includes disposing the purification device 126 having the cold side chamber 132 in fluid communication with the pump 124 and the heat exchanger 116 and the hot side chamber 134 in fluid communication with the heat exchanger 116 and the reservoir 122. At step 210, the method 200 further includes forming water, via thermal co-operation of the cold and hot side chambers 132, 134 of the purification device 126 by developing condensate from moisture present in the ambient air between the cold and hot side chambers 132, 134 of the purification device 126.

Various embodiments disclosed herein are to be taken in the illustrative and explanatory sense and should in no way be construed as limiting of the present disclosure. All joinder references (e.g., associated, coupled, connected and the like) are only used to aid the reader's understanding of the present disclosure, and may not create limitations, particularly as to the position, orientation, or use of the components disclosed herein. Therefore, joinder references, if any, are to be construed broadly. Moreover, such joinder references do not necessarily infer that two elements are directly connected to each other.

Additionally, all positional terms, such as, but not limited to, "first", "second" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element relative to, or over, another element.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional components, such features may be omitted from the scope of the present disclosure without departing from the spirit of the present disclosure as defined in the appended claims.

INDUSTRIAL APPLICABILITY

The present disclosure has applicability for use and implementation in harnessing thermal energy from a heat source and effectively utilizing the harnessed thermal energy to purify water. Embodiments of the present disclosure allow for a simple system design as a single pump is adequate to setup and operatively provide fluid flow in the system 114 for purifying water.

Moreover, with use of embodiments disclosed herein, it is envisioned that optimal thermal management of heat sources such as, but not limited to, engines can be accomplished while also effectively utilizing the thermal energy harnessed from such heat sources for a specific function i.e., to purify water. The single pump 124 required to provide fluid flow in the system 114 of the present disclosure can help render the system 114 inexpensive to setup and economical to operate, thereby incurring reduced costs associated with ownership, operation, and maintenance as compared to previously known conventional heat harnessing systems.

With addition of the system 114, for purifying water, to the cooling jacket 106 associated with the engine 102, manufacturers can now contemplate reducing a size of the radiator 110 thereby offsetting costs that were previously incurred with the use of a large size radiator. Additionally, or optionally, parasitic loads on the engine 102 such as, but not limited to, a fan 160, or a fan shaft 162 can be operated by the engine 102 for a reduced amount of time, or a reduced amount of power as the thermal management fluid now thermally interacts with the heat exchanger 116.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A system for obtaining purified water using ambient air and heat from a heat source, the system comprising:
 a heat exchanger fluidly coupled to the heat source to receive a thermal management fluid from the heat source;
 a reservoir disposed in fluid communication with the heat exchanger, the reservoir configured to supply water at an ambient temperature for receiving heat from the thermal management fluid at the heat exchanger;
 a pump disposed between the reservoir and the heat exchanger, the pump operable to provide a pre-defined flow rate of the water from the reservoir to the heat exchanger based on a temperature gradient of the thermal management fluid across the heat exchanger; and
 a purification device having:
  a cold side chamber disposed in fluid communication with the pump and the heat exchanger, the cold side chamber configured to allow passage of the water from the reservoir therethrough, and
  a hot side chamber disposed in fluid communication with the heat exchanger and the reservoir, the hot side chamber configured to allow passage of the water from the heat exchanger therethrough, wherein the cold and hot side chambers of the purification device thermally co-operate with each other to develop condensate therebetween from moisture present in the ambient air for forming purified condensate water.

2. The system of claim 1, wherein the pre-defined flow rate of the water supplied by the pump to the heat exchanger is directly proportional to the temperature gradient of the thermal management fluid across the heat exchanger.

3. The system of claim 1, wherein the heat exchanger includes:
 a first inlet port for receiving the thermal management fluid; and a first outlet port in fluid communication with the first inlet port for allowing the thermal management fluid to egress the heat exchanger.

4. The system of claim 3 further comprising:
a first temperature sensor disposed at the first inlet port, the first temperature sensor configured to measure a first temperature value associated with the thermal management fluid entering the heat exchanger via the first inlet port;
a second temperature sensor disposed at the first outlet port, the second temperature sensor configured to measure a second temperature value associated with the thermal management fluid egressing the heat exchanger via the first outlet port; and
a controller disposed in communication with the first temperature sensor, the second temperature sensor, and the pump, the controller configured to:
receive the first and second temperature values from the first and second temperature sensors respectively;
determine the temperature gradient of the thermal management fluid across the heat exchanger from the first and second temperature values; and
vary a displacement of the pump for facilitating the pump to provide the pre-defined flow rate of the water from the reservoir to the heat exchanger based on the determined temperature gradient of the thermal management fluid across the heat exchanger.

5. The system of claim 1, wherein the heat exchanger includes:
a second inlet port for receiving the water, from the reservoir, supplied by the pump via the cold side chamber of the purification device; and
a second outlet port in fluid communication with the second inlet port for allowing the received water to egress the heat exchanger, the second outlet port configured to fluidly communicate heated water to the reservoir via the hot side chamber of the purification device.

6. The system of claim 1 further comprising a purified water tank in fluid communication with the purification device, the purified water tank configured to receive the purified condensate water formed between the hot and cold side chambers of the purification device.

7. An integrated thermal management and water purification system for obtaining purified water using ambient air and heat from a heat source, the integrated thermal management and water purification system comprising:
the heat source, including at least an engine;
a heat exchanger fluidly coupled to the engine to receive a thermal management fluid from the engine;
a reservoir disposed in fluid communication with the heat exchanger, the reservoir configured to supply water at an ambient temperature for receiving heat from the thermal management fluid at the heat exchanger;
a pump disposed between the reservoir and the heat exchanger, the pump operable to provide a pre-defined flow rate of the water supplied by the reservoir to the heat exchanger based on a thermal gradient of the thermal management fluid across the heat exchanger; and
a purification device having:
a cold side chamber disposed in fluid communication with the pump and the heat exchanger, the cold side chamber configured to allow passage of the water from the reservoir therethrough, and
a hot side chamber disposed in fluid communication with the heat exchanger and the reservoir, the hot side chamber configured to allow passage of the water from the heat exchanger therethrough, wherein the cold and hot side chambers of the purification device thermally co-operate with each other to develop condensate therebetween from moisture present in the ambient air for forming purified condensate water.

8. The integrated thermal management and water purification system of claim 7, wherein the pre-defined flow rate of the water supplied by the pump to the heat exchanger is directly proportional to the temperature gradient of the thermal management fluid across the heat exchanger.

9. The integrated thermal management and water purification system of claim 7, wherein the heat exchanger includes:
a first inlet port for receiving the thermal management fluid; and
a first outlet port in fluid communication with the first inlet port for allowing the thermal management fluid to egress the heat exchanger.

10. The integrated thermal management and water purification system of claim 9 further comprising:
a first temperature sensor disposed at the first inlet port, the first temperature sensor configured to measure a first temperature value associated with the thermal management fluid entering the heat exchanger via the first inlet port;
a second temperature sensor disposed at the first outlet port, the second temperature sensor configured to measure a second temperature value associated with the thermal management fluid egressing the heat exchanger via the first outlet port; and
a controller disposed in communication with the first temperature sensor, the second temperature sensor, and the pump, the controller configured to:
receive the first and second temperature values from the first and second temperature sensors respectively;
determine the temperature gradient of the thermal management fluid across the heat exchanger from the first and second temperature values; and
vary a displacement of the pump for facilitating the pump to provide the pre-defined flow rate of the water from the reservoir to the heat exchanger based on the determined temperature gradient of the thermal management fluid across the heat exchanger.

11. The integrated thermal management and water purification system of claim 7, wherein the heat exchanger includes:
a second inlet port for receiving the water supplied, from the reservoir, by the pump via the cold side chamber of the purification device; and
a second outlet port in fluid communication with the second inlet port for allowing the received water to egress the heat exchanger, the second outlet port configured to fluidly communicate heated water to the reservoir via the hot side chamber of the purification device.

12. The integrated thermal management and water purification system of claim 7 further comprising a purified water tank in fluid communication with the purification device, the purified water tank configured to receive the purified condensate water formed between the hot and cold side chambers of the purification device.

13. A method for obtaining purified water using ambient air and heat from a heat source, the method comprising:

receiving a thermal management fluid from the heat source at a heat exchanger fluidly coupled to the heat source;

supplying water from a reservoir to the heat exchanger at an ambient temperature for receiving heat from the thermal management fluid at the heat exchanger;

providing, by means of a pump, a pre-defined flow rate of the water from the reservoir to the heat exchanger based on a temperature gradient of the thermal management fluid across the heat exchanger; and disposing a purification device having a cold side chamber in fluid communication with the pump and the heat exchanger and a hot side chamber in fluid communication with the heat exchanger and the reservoir;

forming purified condensate water, via thermal co-operation of the cold and hot side chambers of the purification device by developing condensate from moisture present in the ambient air between the cold and hot side chambers of the purification device.

14. The method of claim 13, wherein the pre-defined flow rate of the water is directly proportional to the temperature gradient of the thermal management fluid across the heat exchanger.

15. The method of claim 13, wherein the heat exchanger includes:
   a first inlet port for receiving the thermal management fluid; and
   a first outlet port in fluid communication with the first inlet port for allowing the thermal management fluid to egress the heat exchanger.

16. The method of claim 15 further comprising providing:
   a first temperature sensor at the first inlet port for measuring a first temperature value associated with the thermal management fluid entering the heat exchanger via the first inlet port;
   a second temperature sensor at the first outlet port for measuring a second temperature value associated with the thermal management fluid egressing the heat exchanger via the first outlet port; and
   a controller in communication with the first temperature sensor, the second temperature sensor, and the pump for:
      receiving the first and second temperature values from the first and second temperature sensors respectively;
      determining the temperature gradient of the thermal management fluid across the heat exchanger from the first and second temperature values; and
      varying a displacement of the pump for to provide the pre-defined flow rate of the water from the reservoir to the heat exchanger based on the determined temperature gradient of the thermal management fluid across the heat exchanger.

17. The method of claim 13, wherein the heat exchanger includes:
   a second inlet port for receiving the water supplied, from the reservoir, by the pump via the cold side chamber of the purification device; and
   a second outlet port in fluid communication with the second inlet port for allowing the received water to egress the heat exchanger, the second outlet port configured to fluidly communicate heated water to the reservoir via the hot side chamber of the purification device.

18. The method of claim 13 further comprising providing a purified water tank in fluid communication with the purification device for receiving the purified condensate water formed between the hot and cold side chambers of the purification device.

* * * * *